US011434856B2

(12) United States Patent
Kennedy et al.

(10) Patent No.: US 11,434,856 B2
(45) Date of Patent: Sep. 6, 2022

(54) SYSTEM AND METHOD FOR EVACUATING LIQUEFIED PETROLEUM (LP) GAS FROM A FUEL DISTRIBUTION SYSTEM

(71) Applicant: Blossman Services, Inc., Ocean Springs, MS (US)

(72) Inventors: David Alexander Kennedy, Asheville, NC (US); Jessie W. Johnson, Asheville, NC (US)

(73) Assignee: Blossman Services, Inc., Ocean Springs, MS (US)

( * ) Notice: Subject to any disclaimer, the term of this patent is extended or adjusted under 35 U.S.C. 154(b) by 0 days.

(21) Appl. No.: 16/752,012

(22) Filed: Jan. 24, 2020

(65) Prior Publication Data

US 2021/0231086 A1    Jul. 29, 2021

(51) Int. Cl.
| | |
|---|---|
| *F02B 43/00* | (2006.01) |
| *F02D 19/02* | (2006.01) |
| *F02M 21/02* | (2006.01) |
| *F02M 37/00* | (2006.01) |
| *B60K 15/03* | (2006.01) |
| *F02D 19/06* | (2006.01) |

(52) U.S. Cl.
CPC ......... *F02M 37/0023* (2013.01); *B60K 15/03* (2013.01); *F02D 19/0681* (2013.01); *F02M 21/0212* (2013.01); *F02M 21/0227* (2013.01); *F02M 21/0242* (2013.01); *F02M 37/007* (2013.01); *B60K 2015/03256* (2013.01); *B60K 2015/03473* (2013.01)

(58) Field of Classification Search
CPC ........... B60K 2015/03013; B60K 2015/03256; B60K 2015/03473; F02D 19/025; F02D 19/0681; F02B 43/12; F02B 2043/103; F02M 21/0212; F02M 21/0227; F02M 21/0242; F02M 37/0023; F02M 37/007
USPC .................................. 123/27 GE, 525–529
See application file for complete search history.

(56) References Cited

U.S. PATENT DOCUMENTS

| | | | | |
|---|---|---|---|---|
| 3,763,840 | A * | 10/1973 | Schimmelpfenig | ......................... F02M 37/0082 137/469 |
| 5,887,567 | A * | 3/1999 | White | .................. F02M 21/029 123/294 |
| 8,516,997 | B2 * | 8/2013 | Pursifull | ............... F02D 19/022 123/516 |
| 9,027,534 | B2 * | 5/2015 | Kim | ........................ F02D 19/10 123/525 |
| 9,732,713 | B2 * | 8/2017 | Bandyopadhyay | ......................... F02M 25/0836 |
| 10,180,212 | B2 * | 1/2019 | Harper | .................. F02D 19/022 |
| 2009/0025824 | A1 * | 1/2009 | Noujima | ............... F17C 11/005 141/93 |

(Continued)

*Primary Examiner* — Erick R Solis
(74) *Attorney, Agent, or Firm* — Sterne, Kessler, Goldstein & Fox P.L.L.C.

(57) ABSTRACT

A vehicle includes an engine and a fuel system. The fuel system includes a fuel tank that stores liquefied petroleum (LP) fuel. The fuel tank includes a tank outlet port and a tank return port. The fuel distribution system supplies fuel from the fuel tank to the engine and returns unused fuel to the fuel tank. The fuel distribution system includes an engine supply line coupled to the tank outlet port, and a fuel rail disposed on the engine and coupled to the engine supply line. The fuel system includes a fuel discharge valve disposed on the fuel distribution system for removing fuel from the fuel distribution system.

15 Claims, 10 Drawing Sheets

(56) References Cited

U.S. PATENT DOCUMENTS

| | | | |
|---|---|---|---|
| 2014/0081565 A1* | 3/2014 | Pursifull | F02D 19/0605 701/113 |
| 2015/0211446 A1* | 7/2015 | Bennett | F02M 21/0221 123/445 |
| 2015/0377159 A1* | 12/2015 | Fisher | F02D 41/0025 123/525 |
| 2016/0325769 A1* | 11/2016 | Rosa | B61C 17/02 |
| 2017/0030524 A1* | 2/2017 | Tilander | B60S 5/02 |
| 2018/0029868 A1* | 2/2018 | Kennedy | F17C 13/04 |
| 2018/0209590 A1* | 7/2018 | Szoucsek | F17C 13/02 |
| 2019/0338887 A1* | 11/2019 | Ehgartner | H01M 8/04201 |

\* cited by examiner

SYSTEM AND METHOD FOR EVACUATING LIQUEFIED PETROLEUM (LP) GAS FROM A FUEL DISTRIBUTION SYSTEM

BACKGROUND

Field

The disclosure relates to systems and methods for evacuating liquefied petroleum (LP) gas from a vehicle fuel distribution system.

Background

LP gas is a by-product of natural gas processing and includes such fuels as propane and butane, and may also include amounts of propylene and butylene in various mixtures. As used herein, the terms "liquefied petroleum gas," "LP gas," and "LPG" are used interchangeably and are intended to refer to propane, butane, iso-butane, propylene, butylene, and methane, alone or in various mixtures, as well as to mixtures of other hydrocarbon gases that are stored in liquid form, under pressure, and are used as fuel for internal combustion engines.

LP gas is highly flammable and is commonly used for fueling cooking and heating appliances. LP gas is also increasingly being used to power personal and commercial vehicles. At normal atmospheric temperatures and pressures, LP gas is in a gas phase, but LP gas is in a liquid phase when stored under pressure, such as in a vehicle fuel tank. A partially filled vehicle fuel tank will typically contain some LP gas in a liquid phase as well as some LP gas in a gas phase.

When it is necessary to repair or replace the parts of the vehicle fuel system, such as the fuel injectors or engine fuel rail, the fuel system must be emptied to reduce fire or explosion hazard. Conventionally, when a vehicle fuel system is filled with an LP gas and needs to be emptied, the evacuation process is done manually by bleeding the LP gas from the fuel system into the atmosphere. This method is slow and dangerous, as it poses a fire or explosion risk. This method also wastes significant amounts of LP gas. Further, gas-phase LP gas tends to remain in the fuel distribution system, even after draining. In addition, typical procedures for emptying the fuel system requires emptying the fuel in the fuel reservoir (i.e., the vehicle fuel tank), which results in excessive waste of LP fuel.

Accordingly, a better method is needed for emptying the fuel distribution system of LP fuel in an environmentally-responsible, time-efficient, and safe manner, and for capturing and storing the removed LP gas for later refilling of the vehicle fuel tank or for other use.

BRIEF SUMMARY

The present disclosure includes various embodiments of a fuel system for a vehicle.

In some embodiments, a fuel system includes a fuel tank configured to store liquefied petroleum (LP) fuel. In some embodiments, the fuel tank has a tank outlet port. In some embodiments, a fuel distribution system is configured to supply fuel from the fuel tank to an engine, with the fuel distribution system having an engine supply line coupled to the tank outlet port. In some embodiments, a fuel rail is coupled to the engine supply line and a fuel discharge valve is disposed on the fuel distribution system for removing fuel from the fuel distribution system.

In some embodiments, the fuel discharge valve is a Schrader valve. In some embodiments, the fuel system includes an isolation valve coupled to the fuel distribution system and configured to selectively isolate the fuel stored in the fuel tank from at least a portion of the fuel distribution system.

In some embodiments, the fuel discharge valve is disposed in the engine supply line between the tank outlet port and the fuel rail. In some embodiments, the fuel discharge valve is configured to allow removal of fuel from the isolated portion of the fuel distribution system without requiring removal of fuel from the fuel tank. In some embodiments, the fuel discharge valve is disposed on the fuel rail. In some embodiments, the fuel discharge valve is configured to allow removal of fuel from the isolated portion of the fuel distribution system without requiring removal of fuel from the fuel tank.

In some embodiments, the fuel system includes a fuel line filter serially coupled to the engine supply line, and the fuel discharge valve is coupled to the fuel line filter. In some embodiments, the fuel system includes a supply pump coupled to the engine supply line for driving fuel flow from the tank outlet port to the fuel rail. In some embodiments, the fuel discharge valve is coupled to the supply pump.

In some embodiments, the fuel tank includes a tank return port configured to receive fuel from the fuel distribution system. In some embodiments, the fuel distribution system includes a fuel pressure regulator coupled to the fuel rail. In some embodiments, the fuel pressure regulator is configured to divert fuel from the fuel rail. In some embodiments, a return line is coupled to the fuel pressure regulator and the tank return port for returning fuel diverted from the fuel pressure regulator to the fuel tank through the tank return port.

In some embodiments, the fuel discharge valve is coupled to the fuel pressure regulator. In some embodiments, the fuel system includes a check valve coupled to the return line. In some embodiments, the check valve is configured to prevent the fuel stored in the fuel tank from flowing toward the fuel rail.

In some embodiments, the fuel tank further includes a tank fill port configured to receive fuel from the fuel distribution system. In some embodiments, the fuel distribution system further includes a vehicle fuel return valve including a receiving port coupled to the tank outlet port via an engine supply line, a first outlet port coupled to the tank fill port via a refuel line, and a second outlet port coupled to the fuel rail of the vehicle via the engine supply line. In some embodiments, the vehicle fuel return valve is configured to selectively direct fuel from the receiving port to the tank fill port to remove fuel from the fuel distribution system.

The present disclosure includes methods for evacuating liquefied petroleum (LP) from a fuel distribution system. In some embodiments of the method, the fuel distribution system supplies fuel from a fuel tank having an outlet port to an engine of a vehicle. In some embodiments of the method, the fuel distribution system includes an engine supply line and a fuel rail.

In some embodiments, the method includes closing an isolation valve that is located in the fuel distribution system to isolate at least a portion of the fuel distribution system from fuel stored in the fuel tank. In some embodiments, the method includes connecting a fuel evacuation system to a fuel discharge valve disposed in the isolated portion of the fuel distribution system. In some embodiments, the method includes removing, through the fuel discharge valve, fuel from the isolated portion of the fuel distribution system.

In some embodiments of the method, the fuel discharge valve is disposed in the engine supply line between the tank outlet port and the fuel rail. In some embodiments of the method, the fuel discharge valve is disposed on the fuel rail. In some embodiments of the method, the fuel discharge valve is coupled to a fuel pressure regulator of the fuel distribution system. In some embodiments of the method, the fuel pressure regulator is coupled to the fuel rail. In some embodiments, the fuel discharge valve is disposed in a return line of the fuel distribution system. In some embodiments of the method, the return line is coupled to a tank return port of the fuel tank and a pressure regulator coupled to the fuel rail. In some embodiments of method, the fuel discharge valve is coupled to a supply pump coupled to the engine supply line. In some embodiments, the fuel discharge valve is coupled to a fuel filter coupled to the engine supply line.

In some embodiments, a fuel system for a vehicle includes a fuel tank configured to store liquefied petroleum (LP) fuel. In some embodiments, the fuel tank includes a tank outlet port. In some embodiments, the fuel system includes a fuel distribution system configured to supply fuel from the fuel tank to an engine. In some embodiments, the fuel distribution system includes an engine supply line coupled to the tank outlet port. In some embodiments, and the fuel distribution system includes a supply pump coupled to the engine supply line for driving fuel flow from the tank outlet port of the fuel tank to the engine. In some embodiments, the fuel system includes a fuel discharge valve coupled to the supply pump for removing fuel from the engine supply line.

In some embodiments, the fuel tank includes a tank return port configured to receive fuel from the fuel distribution system. In some embodiments, the fuel distribution system includes a flush line coupled to the supply pump and the tank return port for returning fuel from the engine supply line to the fuel tank through the tank return port.

In some embodiments, the fuel system includes an isolation valve coupled to the fuel distribution system and configured to selectively isolate the fuel stored in the fuel tank from at least a portion of the fuel distribution system. In some embodiments, the fuel discharge valve is configured to allow removal of fuel from the isolated portion of the fuel distribution system without requiring removal of fuel from the fuel tank.

In some embodiments, the fuel distribution system includes a fuel rail coupled to the engine supply line via the supply pump.

In some embodiments, the fuel system includes a second fuel discharge valve disposed on the fuel rail. In some embodiments, the second fuel discharge valve is configured to allow removal of fuel from the isolated portion of the fuel distribution system without requiring removal of fuel from the fuel tank.

In some embodiments, the fuel tank includes a tank return port configured to receive fuel from the fuel distribution system. In some embodiments, the fuel distribution system includes a fuel pressure regulator coupled to the fuel rail. In some embodiments, the fuel pressure regulator is configured to divert fuel from the fuel rail. In some embodiments, the fuel distribution system includes a return line coupled to the fuel pressure regulator and the tank return port for returning fuel directed from the fuel pressure regulator to the tank return port.

The present disclosure includes various embodiments of a vehicle.

In some embodiments, the vehicle includes an engine and a fuel system. In some embodiments, the fuel system of the vehicle includes a fuel tank configured to store liquefied petroleum (LP) fuel. In some embodiments, the fuel tank includes a tank outlet port. In some embodiments, the fuel system includes a fuel distribution system configured to supply fuel from the fuel tank to an engine. In some embodiments, the fuel distribution system includes an engine supply line coupled to the tank outlet port. In some embodiments, the fuel distribution system includes a fuel rail coupled to the engine supply line. In some embodiments, the fuel system includes a fuel discharge valve disposed on the fuel distribution system for removing fuel from the fuel distribution system.

In some embodiments of the vehicle, the fuel discharge valve is disposed in the engine supply line between the tank outlet port and the fuel rail. In some embodiments of the vehicle, the fuel discharge valve is configured to allow removal of fuel from the isolated portion of the fuel distribution system without requiring removal of fuel from the fuel tank. In some embodiments of the vehicle, the fuel discharge valve is disposed on the fuel rail. In some embodiments of the vehicle, the fuel discharge valve is configured to allow removal of fuel from the isolated portion of the fuel distribution system without requiring removal of fuel from the fuel tank.

In some embodiments of the vehicle, the fuel system includes a fuel line filter serially coupled to the engine supply line, and the fuel discharge valve is coupled to the fuel line filter. In some embodiments of the vehicle, the fuel system includes a supply pump coupled to the engine supply line for driving fuel flow from the tank outlet port to the fuel rail. In some embodiments of the vehicle, the fuel discharge valve is coupled to the supply pump.

In some embodiments of the vehicle, the fuel tank includes a tank return port configured to receive fuel from the fuel distribution system. In some embodiments of the vehicle, the fuel distribution system includes a fuel pressure regulator coupled to the fuel rail. In some embodiments of the vehicle, the fuel pressure regulator can be configured to divert fuel from the fuel rail. In some embodiments of the vehicle, a return line can be coupled to the fuel pressure regulator and the tank return port for returning fuel diverted from the fuel pressure regulator to the fuel tank through the tank return port.

In some embodiments of the vehicle, the fuel discharge valve is coupled to the fuel pressure regulator. In some embodiments of the vehicle, the fuel system includes a second isolation valve coupled to the return line. In some embodiments of the vehicle, the second isolation valve is configured to selectively isolate the fuel stored in the fuel tank from the fuel rail.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the pertinent art to make and use the embodiments.

The present disclosure will be described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

The following Detailed Description refers to accompanying drawings to illustrate embodiments consistent with the disclosure. References in the Detailed Description to "one embodiment," "an embodiment," "some embodiments," "certain embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is within the knowledge of those skilled in the relevant art(s) to affect such feature, structure, or characteristic in connection with other embodiments whether or not explicitly described.

The term "about" or "substantially" or "approximately" as used herein indicates the value of a given quantity that can vary based on a particular technology. Based on the particular technology, the term "about" or "substantially" or "approximately" can indicate a value of a given quantity that varies within, for example, 1-15% of the value (e.g., ±1%, ±2%, ±5%, ±10%, or ±15% of the value).

The following Detailed Description of the embodiments reveals the general nature of the disclosure so that others can, by applying knowledge of those skilled in the relevant art(s), readily modify and/or adapt for various applications such embodiments, without undue experimentation, without departing from the spirit and scope of the disclosure. Therefore, such adaptations and modifications are intended to be within the meaning and plurality of equivalents of the embodiments based upon the teaching and guidance presented herein. It is to be understood that the phraseology or terminology herein is for the purpose of description and is to be interpreted by those skilled in relevant art(s) in light of the teachings herein.

With the increase in use of personal and commercial vehicles powered by LP gas, the frequency of servicing parts (e.g., a fuel injector) of the fuel system are becoming more frequent. Servicing parts of the fuel system, however, requires evacuating LP fuel from the fuel system. Conventional methods for removing LP fuel from the fuel system typically lead to wastes of significant LP gas and the spread of fugitive emissions.

The present disclosure presents fuel systems and methods for evacuating LP fuel from a fuel distribution system that overcomes the limitations of known systems and methods noted above. The disclosed fuel systems can include a fuel tank (e.g., a vehicle fuel tank) configured to store liquefied petroleum (LP) fuel and a fuel distribution system configured to supply fuel from the fuel tank to the engine of the vehicle and return unused fuel back to the fuel tank. The fuel tank can include a tank outlet port. The fuel distribution system can include an engine supply line coupled to the tank outlet port and a fuel rail coupled to the engine supply line. The fuel system can include a fuel discharge valve disposed on the fuel distribution system for removing fuel from the fuel distribution system.

Figure 1:
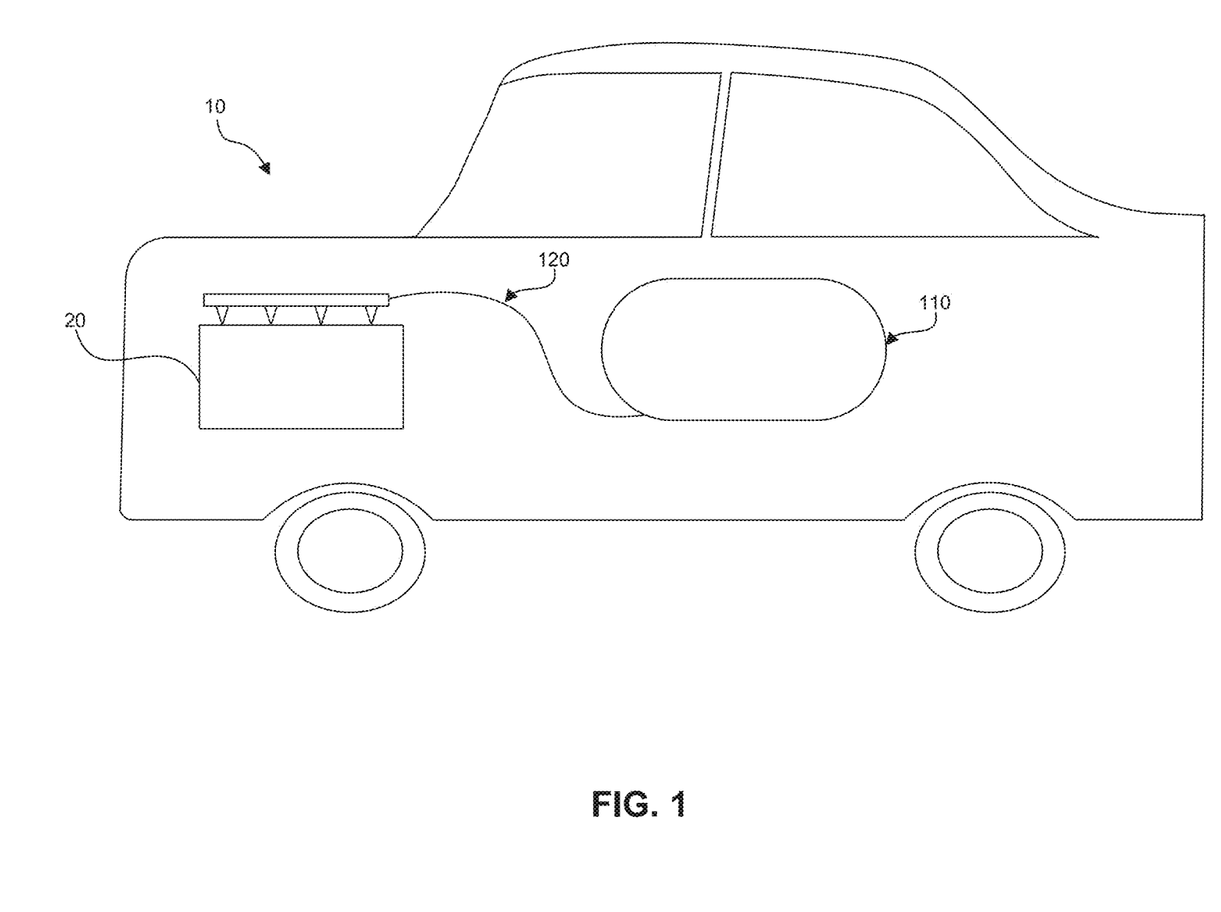
FIG. 1 is a schematic diagram illustrating a vehicle including a fuel system according to embodiments of the present disclosure.

Embodiments will now be described in more detail with reference to the figures. Referring to FIG. 1, for example, a vehicle 10 may include an engine 20 configured to operate on LP fuel. In some embodiments, vehicle 10 may be an automobile, a bus, a truck, a freight carrier, off-road vehicle, aircraft, boat, or some other vehicle. In some embodiments, vehicle 10 may include a fuel system 100 (see FIG. 2) for storing and delivering LP fuel to engine 20 of vehicle 10. In some embodiments, engine 20 may be a direct injection spark ignition engine 20, in which the fuel system 100 is configured to inject fuel directly into the cylinders of engine 20.

FIGS. 2-9 are schematic diagrams illustrating embodiments of fuel system 100 connected to an evacuation system 200 for removing LP fuel from at least a portion of the fuel system 100. In some embodiments, fuel system 100 may include a vehicle fuel tank 110 configured to store LP fuel. In some embodiments, fuel system 100 may include a fuel distribution system 120 configured to supply fuel from the vehicle fuel tank 110 to engine 20. In some embodiments, fuel distribution system 120 may be configured to return unused fuel back to the vehicle fuel tank 110. In some embodiments, fuel system 100 may include a fuel discharging assembly 130 configured to selectively isolate fuel stored in fuel tank 110 from at least a portion of fuel distribution system 120. In some embodiments, fuel discharging assembly 130 is configured to connect the isolated portion of the fuel distribution system 120 to evacuation system 200 to allow removal of fuel from the isolated portion of fuel distribution system 120 without requiring removal of fuel from fuel tank 110.

Figure 7:
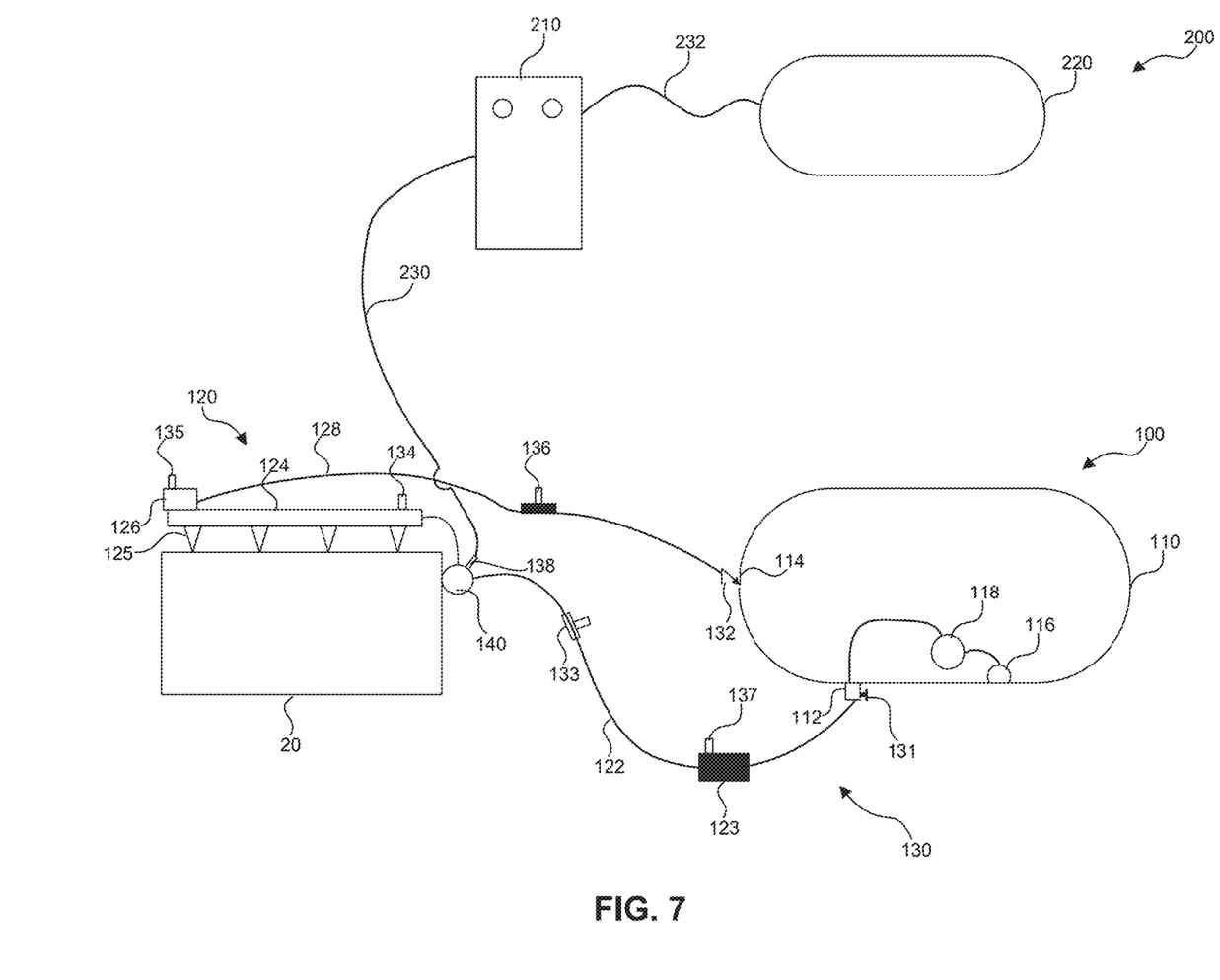
FIG. 7 is a schematic diagram illustrating a fuel system, according to embodiments of the present disclosure.
Figure 8:
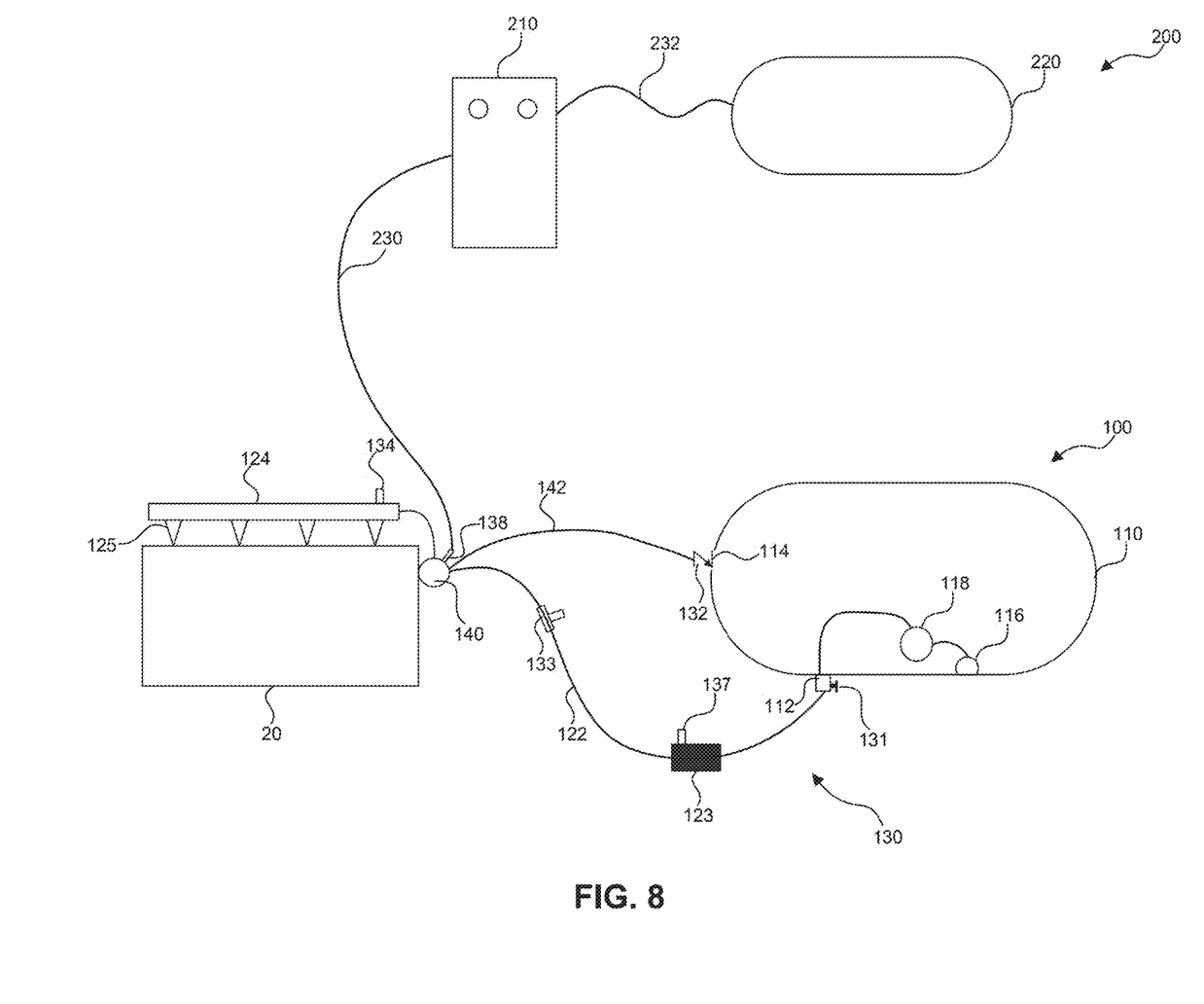
FIG. 8 is a schematic diagram illustrating a fuel system, according to embodiments of the present disclosure.
Figure 9:
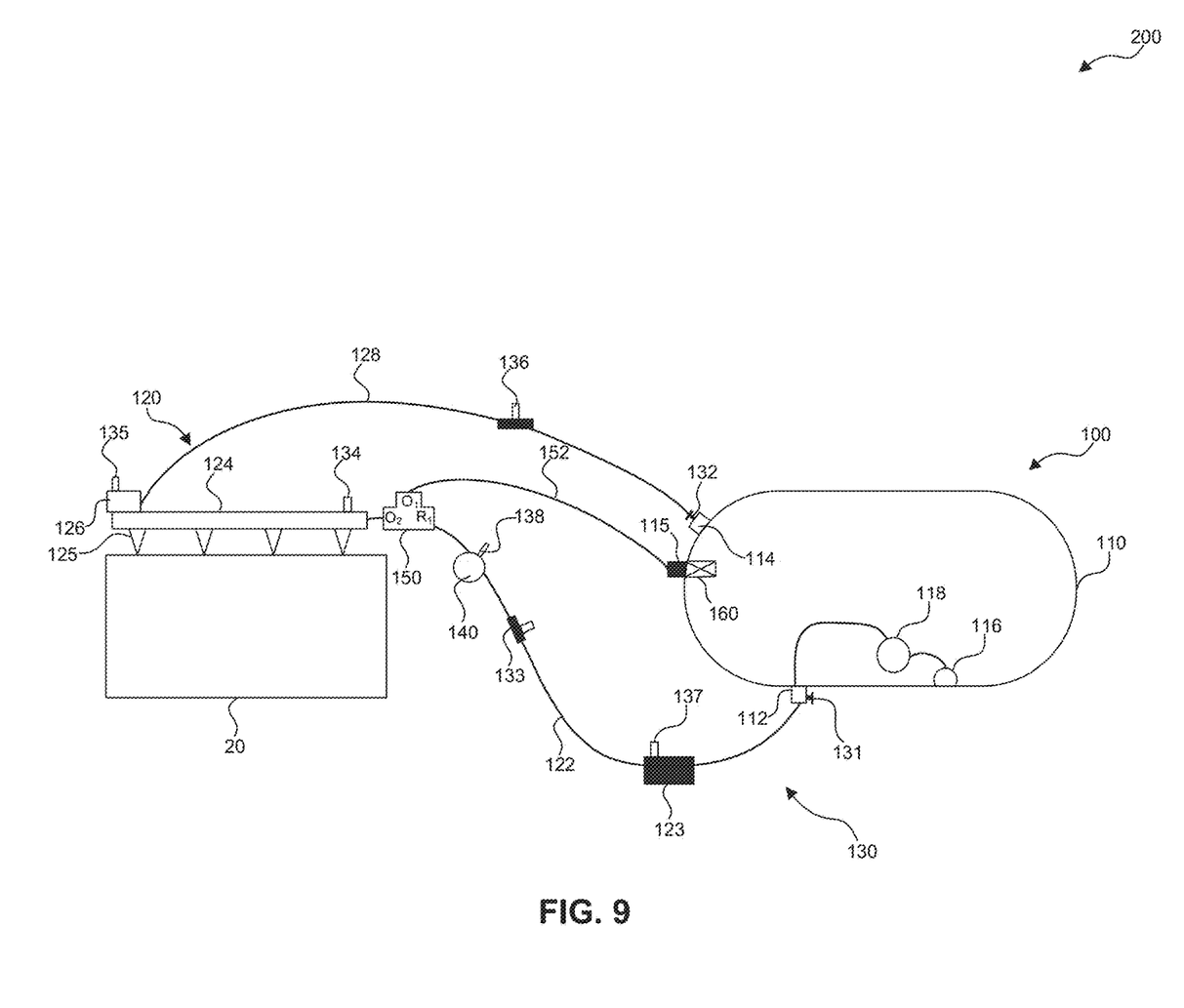
FIG. 9 is a schematic diagram illustrating a fuel system, according to embodiments of the present disclosure.

In some embodiments, as shown in FIGS. 2-9, vehicle fuel tank 110 may include a tank outlet port 112 configured to supply fuel from vehicle fuel tank 110 to engine 20 of vehicle 10. In some embodiments, vehicle fuel tank 110 may include a tank return port 114 configured to receive fuel that was supplied from the vehicle fuel tank 110 and unused by the engine. In some embodiments, as shown in FIG. 9, for example, vehicle fuel tank 110 may include a tank fill port 115 configured to dispense fuel into vehicle fuel tank 110 during refueling. In some embodiments, vehicle fuel tank 110 may include a tank inlet port configured to receive fuel from LP refueling appliance (e.g., dispensing nozzle) by way of a vehicle connector. In some embodiments, vehicle fuel tank 110 may include one or more impermeable shells formed of a material, such as steel or aluminum, suitable for storing and transferring a fuel, such as LP fuel at a gaseous state.

In some embodiments, vehicle fuel tank 110 may include an in-tank fuel pickup 116 configured to receive fuel from within fuel tank 110. In-tank fuel pickup 116 may have a tube, a hose, or a port of a fuel pump selector formed from material(s) that is substantially resistant to degradation by contact with an LP gas. In some embodiments, in-tank fuel pickup 116 may include a filter configured to filter fuel. In some embodiments, vehicle fuel tank 110 may include a fuel pump 118, for example, coupled to the in-tank fuel pickup 116. In some embodiments, fuel pump 118 is configured to drive vapor and/or liquid fuel disposed within the fuel tank 110 to the tank outlet port 112.

In some embodiments, as shown in FIGS. 2-9, fuel distribution system 120 may include an engine supply line 122 coupled to the tank outlet port 112 of vehicle fuel tank 110. In some embodiments, engine supply line 122 is configured to direct fuel supplied from the tank outlet port 112 toward engine 20 of vehicle 10. In some embodiments engine supply line 122 may include a rigid tube having a metal-based material (e.g., stainless steel, brass, or copper), a flexible hose having a polymer-based material (e.g., neoprene rubber), or a combination thereof.

In some embodiments, as shown in FIGS. 2-9, fuel distribution system 120 may include a fuel line filter 123. In some embodiments, fuel line filter 123 may be serially coupled to engine supply line 122. In some embodiments, fuel line filter 123 is configured to remove impurities (e.g., solid particles, liquid droplets) from LP fuel flowing through engine supply line 122. In some embodiments, fuel line filter 123 may include a housing and a porous membrane disposed in the housing. In some embodiments, the membrane may be a micro-membrane having pore sizes ranging from about 0.1 mm to about 10 mm, an ultra-membrane having pore sizes ranging from about 0.0001 mm to about 0.1 mm, or a nano-membrane having pore sizes ranging from about 1 nanometer to about 10 nanometers.

In some embodiments, as shown in FIGS. 2-9, fuel distribution system 120 may include a fuel rail 124 coupled to engine 20 and engine supply line 122. In some embodiments, fuel rail 124 is configured to receive fuel supplied by engine supply line 122 and deliver the fuel at a predetermined pressure (e.g., 1000-3000 PSI) to the intake (e.g., fuel injector, intake manifold, combustion chamber of engine cylinder) of engine 20. In some embodiments, the fuel rail 124 may include a tube having a metal-based material, a plastic-based material, or a combination thereof.

In some embodiments, as shown in FIGS. 2-9, fuel distribution system 120 may include one or more fuel injectors 125 coupled to the fuel rail 124 and in fluid communication with the intake manifold or one or more combustion chambers of engine 20. In some embodiments, fuel injector 125 is configured to inject a predetermined amount of LP fuel into the intake manifold or one or more combustion chambers of engine 20. In some embodiments, fuel injector 125 may include an electronic-actuated solenoid valve to control the injection of LP fuel into engine 20.

In some embodiments, as shown in FIGS. 2-9, as shown in FIGS. 2-9, fuel distribution system 120 may include a fuel pressure regulator 126 coupled to fuel rail 124. In some embodiments, fuel pressure regulator 126 is configured to divert fuel from fuel rail 124 toward vehicle fuel tank 110. In some embodiments, the fuel diverted from fuel rail 124 includes a LP fuel in a liquid state. In some embodiments, fuel pressure regulator 126 is configured to modify the pressure of fuel in the fuel rail 124 so that the fuel delivered to fuel injectors 125 is set at a target pressure level (e.g., 40-600 PSI above tank pressure) that keeps the delivered fuel in a liquid state compared to the temperature of the environment. In some embodiments, fuel pressure regulator 126 is configured to maintain consistent pressure of fuel in fuel rail 124 by diverting liquid and/or gaseous LP fuel out of fuel rail 124. In some embodiments, fuel pressure regulator 126 includes a pressure-actuated valve (e.g., spring-actuated gate-valve or ball-valve) having a first port in fluid communication with fuel rail 124 and a second port for diverting fuel out of fuel rail 124.

In some embodiments, as shown in FIGS. 2-9, fuel distribution system 120 may include a return line 128, for example, coupled to fuel pressure regulator 126 (e.g., coupled to second port of fuel pressure regulator 126) and tank return port 114 of vehicle fuel tank 110 for returning fuel diverted from fuel pressure regulator 126 to vehicle fuel tank 110 through tank return port 114. In some embodiments, return line 128 may include a rigid tube having a metal-based material (e.g., stainless steel, copper, or brass), a flexible hose having a polymer-based material (e.g., neoprene rubber), or a combination thereof.

In some embodiments, as shown in FIGS. 7 and 8, for example, fuel distribution system 120 may include a supply pump 140 coupled to engine supply line 122 downstream of tank outlet port 112 and upstream of fuel rail 124. In some embodiments, supply pump 140 is configured to boost the delivered pressure LP fuel (e.g., liquid LP fuel) from tank outlet port 112 of vehicle fuel tank 110 to engine 20 of vehicle 10. In some embodiments, the supply pump 140 is configured to drive LP fuel at a high pressure, such as in a range of about 40 PSI to about 4,000 PSI, so that fuel may be delivered with sufficient pressure at engine 20. In some embodiments, supply pump 140 is a camshaft-driven pump having a chamber for receiving LP fuel, a reciprocating diaphragm disposed in the chamber for adjusting volume of fuel received in chamber, a mechanical actuator (e.g., pivoting lever) for reciprocating the diaphragm, and a camshaft for driving the mechanical actuator. In some embodiments, supply pump 140 may include an electronic actuator (e.g., solenoid) to drive LP fuel through engine supply line 122.

In some embodiments, as shown in FIG. 8, for example, fuel distribution system 120 may include a flush line 142 coupled to supply pump 140 and tank return port 114 of vehicle fuel tank 110 for returning LP fuel from engine supply line 122 to vehicle fuel tank 110 through tank return port 114. In some embodiments, flush line 142 may include a rigid tube having a metal-based material (e.g., stainless steel, copper, or brass), a flexible hose having a polymer-based material (e.g., neoprene rubber, polyethylene), or a combination thereof.

In some embodiments, as shown in FIGS. 2-8, evacuation system 200 may include an evacuator 210 configured to remove LP fuel (e.g., gaseous LP fuel) from the fuel system 100. In some embodiments, evacuator 210 may include a housing with a plurality of ports and an evacuation pump disposed in the housing. In some embodiments, evacuation system 200 may include a storage tank 220 configured to receive and hold LP fuel driven by the evacuation pump. In some embodiments, the evacuation pump is a pneumatically driven displacement pump (e.g., piston-type pump), such as an air drive, gas booster pump with an air pressure regulator powered by an air compressor. In some embodiments, as shown in FIGS. 2-8, evacuation system 200 may include one or more connection tubes 230, 232 fluidly connecting fuel system 100 of vehicle 10 to evacuator 210 and storage tank 220. In some embodiments, connection tubes 230, 232 may be formed from a material (e.g., copper, brass, steel, nitrile, or polyethylene) suitable to withstand the maximum allowable operating system pressures (e.g., 250 PSI-4000 PSI) found in fuel system 100 of vehicle 10. Evacuation system 200 may include any component or be operated in any way, as disclosed in U.S. Pat. No. 10,400,957, the entirety of which is incorporated herein by reference.

In some embodiments, as shown in FIG. 9, fuel distribution system 120 may include a vehicle refueling valve 150 having a receiving port R coupled to tank outlet port 112 via supply line 122, a first outlet port O1 coupled to tank fill port 115 via a refuel line 152, and a second outlet port O2 coupled to fuel rail 124 via supply line 122. In some embodiments, vehicle refueling valve 150 may be configured to selectively direct fuel from the receiving port R to one of the first outlet port O1 or the second outlet port O2. In some embodiments, vehicle refueling valve 150 may direct fuel to the first outlet port O1 during a refuel mode, and to the second outlet port O2 during a run mode. In some embodiments, vehicle refueling valve 236 is a three-port solenoid valve.

In some embodiments, during operation in a refuel mode, vehicle refueling valve 150 may direct fuel through the second outlet port O2 to engine supply line 238. In some embodiments, during operation in a refuel mode, vehicle refueling valve 150 may direct fuel through the first outlet port O1 to vehicle fuel tank 110 via return line 152. In some embodiments, as shown in FIG. 9, fuel distribution system 120 may include supply pump 140 in combination with vehicle refueling valve 150 to drive LP fuel flow through vehicle refueling valve 150.

In some embodiments, as shown in FIG. 9, fuel distribution system 120 may include an overfill protection device (OPD) 160 configured to prevent overfill of fuel in vehicle fuel tank 110. In some embodiments, OPD 160 may include a float located near tank fill port 115 that rises as fuel fills vehicle fuel tank 110 and plugs tank fill port 115 when the fuel level exceeds a particular fuel amount, such as 70%, 80%, or 90% of vehicle fuel tank 110.

In some embodiments, as shown in FIGS. 2-9, fuel discharging assembly 130 may include one or more isolation valves 131 coupled to the fuel distribution system 120, for example at tank outlet port 112 of vehicle fuel tank 110, whereby the one or more isolation valves 131 are configured to selectively isolate fuel stored in vehicle fuel tank 110 from at least a portion of fuel distribution system 120. In some embodiments, fuel discharging assembly may include one or more check valves 132 coupled to the fuel distribution system 120, for example, at tank return port 114 of vehicle fuel tank 110, whereby the one or more check valves 132 are configured to permit fuel flow in only one direction (e.g., from return line 128 to vehicle fuel tank 110). In some embodiments, fuel discharging assembly 130 may include one or more fuel discharge valves 133-139 disposed on the fuel distribution system 120 for removing fuel from the fuel distribution system 120. In some embodiments, the one or more fuel discharge valves 133-139 may be disposed in the isolated portion of the fuel distribution system such that the one or more fuel discharge valves 133-139 allow removal of fuel from the isolated portion of fuel distribution system 120 without requiring removal of fuel from vehicle fuel tank 110.

In some embodiments, the one or more isolation valves 131 may be a two-position valve configured to switch between an open position to permit fluid communication between vehicle fuel tank 110 and fuel distribution system 120 and a closed position to prevent fluid communication between vehicle fuel tank 110 and fuel distribution system 120. In some embodiments, the one or more isolation valves 131 may be a gate valve, a ball valve, a plug valve, a piston valve, a diaphragm valve, or a butterfly valve. In some embodiments, the one or more isolation valves 131 may be electronically-actuated such that isolation valves 131 are actuated between the open and closed positions by a controller (e.g., vehicle electronic control module). For example, isolation valve 131 may be configured to switch from the open position to closed position when an ignition switch is turned off or when the vehicle is otherwise powered off. In some embodiments, the one or more isolation valves 131 may be mechanically-actuated such that isolation valves 131 may be manually switched between the open and closed positions.

In some embodiments, as shown in FIGS. 2-9, the one or more isolation valves 131 may include a first isolation valve 131 coupled to engine supply line 122 and tank outlet port 112. In some embodiments, first isolation valve 131 is configured to selectively isolate the LP fuel stored in vehicle fuel tank 110 from engine supply line 122. In some embodiments, the one or more isolation valves 131 may include a second isolation valve coupled to return line 128 and tank return port 114. In some embodiments, first isolation valve 131 is configured to selectively isolate the LP fuel stored in the vehicle fuel tank 110 from supply pump 140. In some embodiments, second isolation valve is configured to selectively isolate the LP fuel stored in vehicle fuel tank 110 from fuel rail 124.

In some embodiments, as shown in FIGS. 2-9, for example, the one or more check valves 132 may include a check valve 132 coupled to return line 128. In some embodiments, check valve 132 may be a back pressure check valve having an inlet coupled to return line 128 and an outlet coupled to tank return port 114. In some embodiments, the one or more check valves 132 may be biased (e.g., by a spring) to a closed position and configured to prevent the fuel stored in vehicle fuel tank 110 from flowing therethrough to return line 128. In some embodiments, the one or more check valves 132 may be configured to switch to an open position in response to receiving flow of fuel from return line 128, whereby the flow of fuel overcomes the bias of check valve 132. By switching to the open position, the one or more check valves 132 may permit fuel to return to the vehicle fuel tank 110 via tank return port 114.

In some embodiments, the one or more fuel discharge valves 133-138 may include a manually-actuated valve configured to be removably coupled to connection tube 230 of evacuation system 200 and divert LP fuel (e.g., gaseous LP fuel) disposed in the fuel distribution system 120 to connection tube 230 such that the evacuator 210 directs LP fuel from the isolated portion of fuel distribution system 120 to storage tank 220. In some embodiments, the one or more fuel discharge valves 133-138 may be a mechanically-actuated valve (e.g., Schrader valve) configured to switch between an open position to divert LP fuel out of the fuel distribution system 120 and a closed position to prevent LP fuel from escaping fuel distribution system 120.

For example, in some embodiments, the one or more fuel discharge valves 133-138 may include a tube having a first end opening into a portion of fuel distribution system 120 (e.g., engine supply line 122, fuel rail 124, or return line 128) and a second end disposed outside fuel distribution system 120 for coupling to connection tube 230 of evacuation system 200. In some embodiments, the one or more fuel discharge valves 133-138 may include a stem disposed in the tube and defining a passageway that extends between the ends of the tube. In some embodiments, the one or more fuel discharge valves 133-138 may include a pin disposed in the passageway of the stem and configured to move between an open position and closed position to selectively permit fluid communication between ends of the tube. In some embodiments, the pin is configured to be biased in a closed position (e.g., by a spring) to prevent communication between ends of tube, and the pin is configured to be depressed into an open position (e.g., by overcoming the bias of the spring) to permit fluid communication between ends of tube.

In some embodiments, the one or more fuel discharge valves 133-138 may be set at various locations along fuel distribution system 120 to allow removal of LP fuel from selected portions of fuel distribution system 120 that are isolated from vehicle fuel tank 110.

Figure 2:
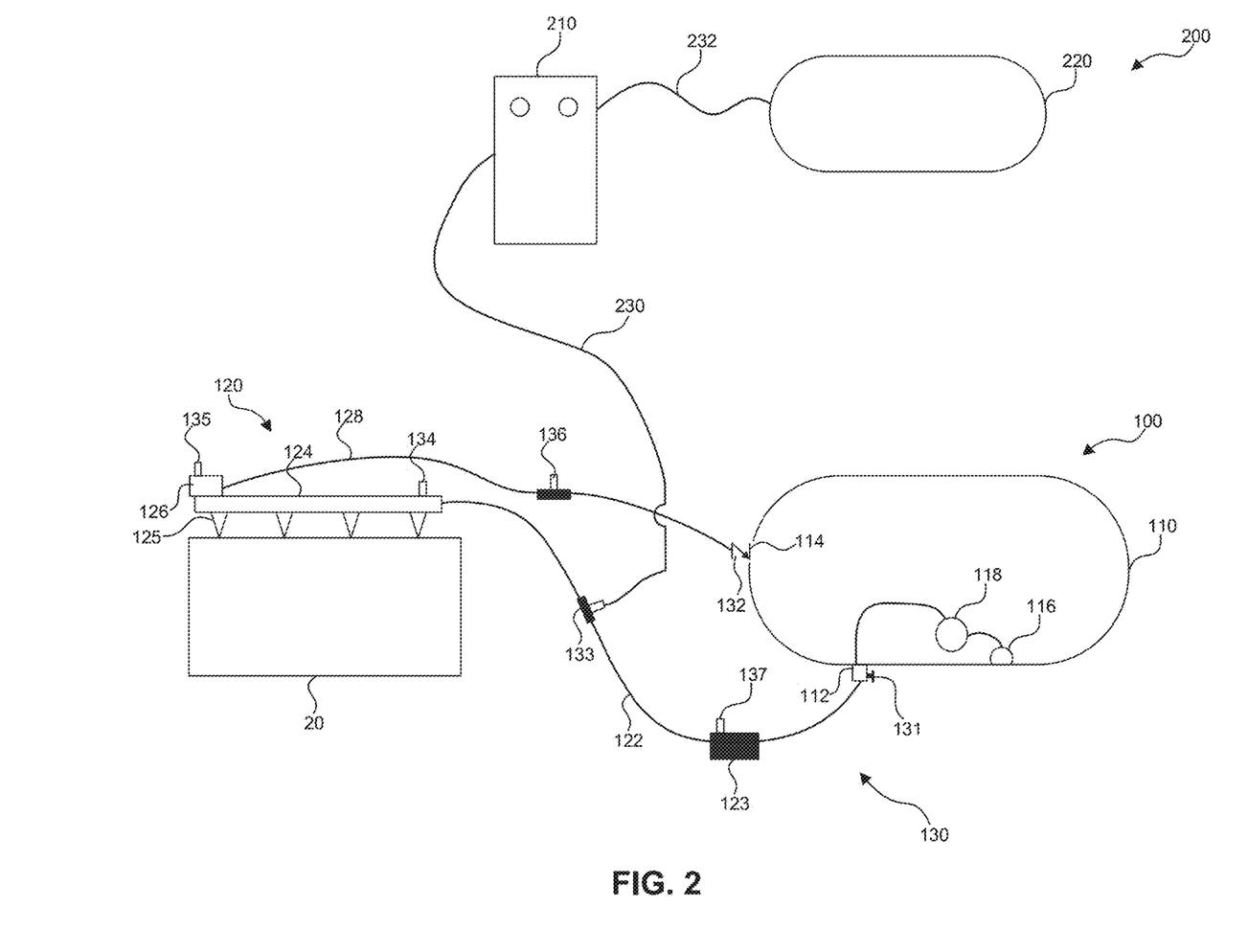
FIG. 2 is a schematic diagram illustrating a fuel system, according to embodiments of the present disclosure.

In some embodiments, as shown in FIGS. 2-8, the one or more fuel discharge valves 133-138 include a first fuel discharge valve 133 coupled to engine supply line 122 between tank outlet port 112 and fuel rail 124. In some embodiments, first fuel discharge valve 133 is configured to allow removal of LP fuel disposed in engine supply line 122, such as removing LP fuel to connection tube 230 of evacuation system 200, as shown in FIG. 2, for example.

Figure 3:
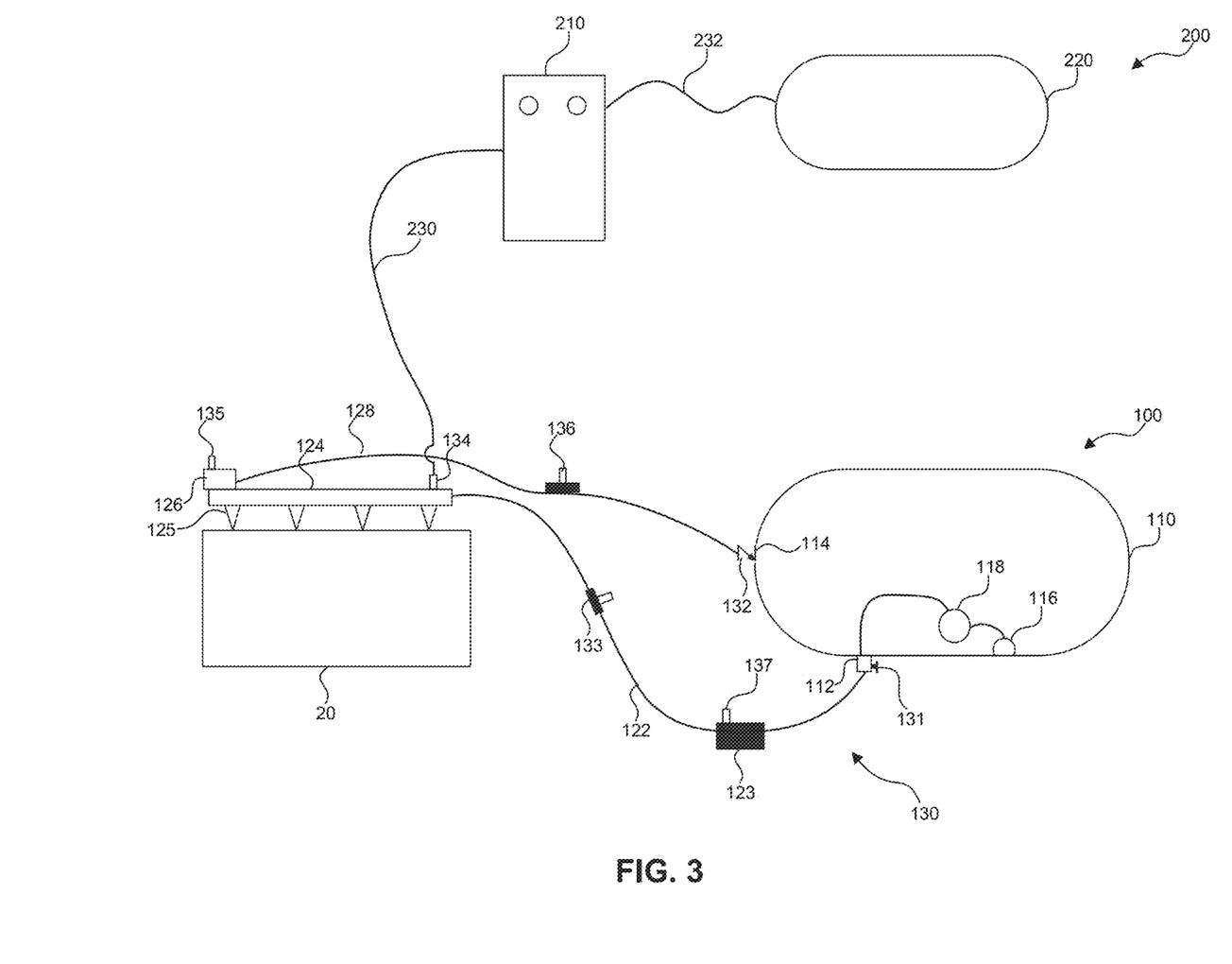
FIG. 3 is a schematic diagram illustrating a fuel system, according to embodiments of the present disclosure.

In some embodiments, as shown in FIGS. 2-8, the one or more fuel discharge valves 133-138 include a second fuel discharge valve 134 coupled to fuel rail 124. In some embodiments, second fuel discharge valve 134 is configured to allow removal of LP fuel disposed in fuel rail 124, such as removing LP fuel to connection tube 230 of evacuation system 200, as shown in FIG. 3, for example.

Figure 4:
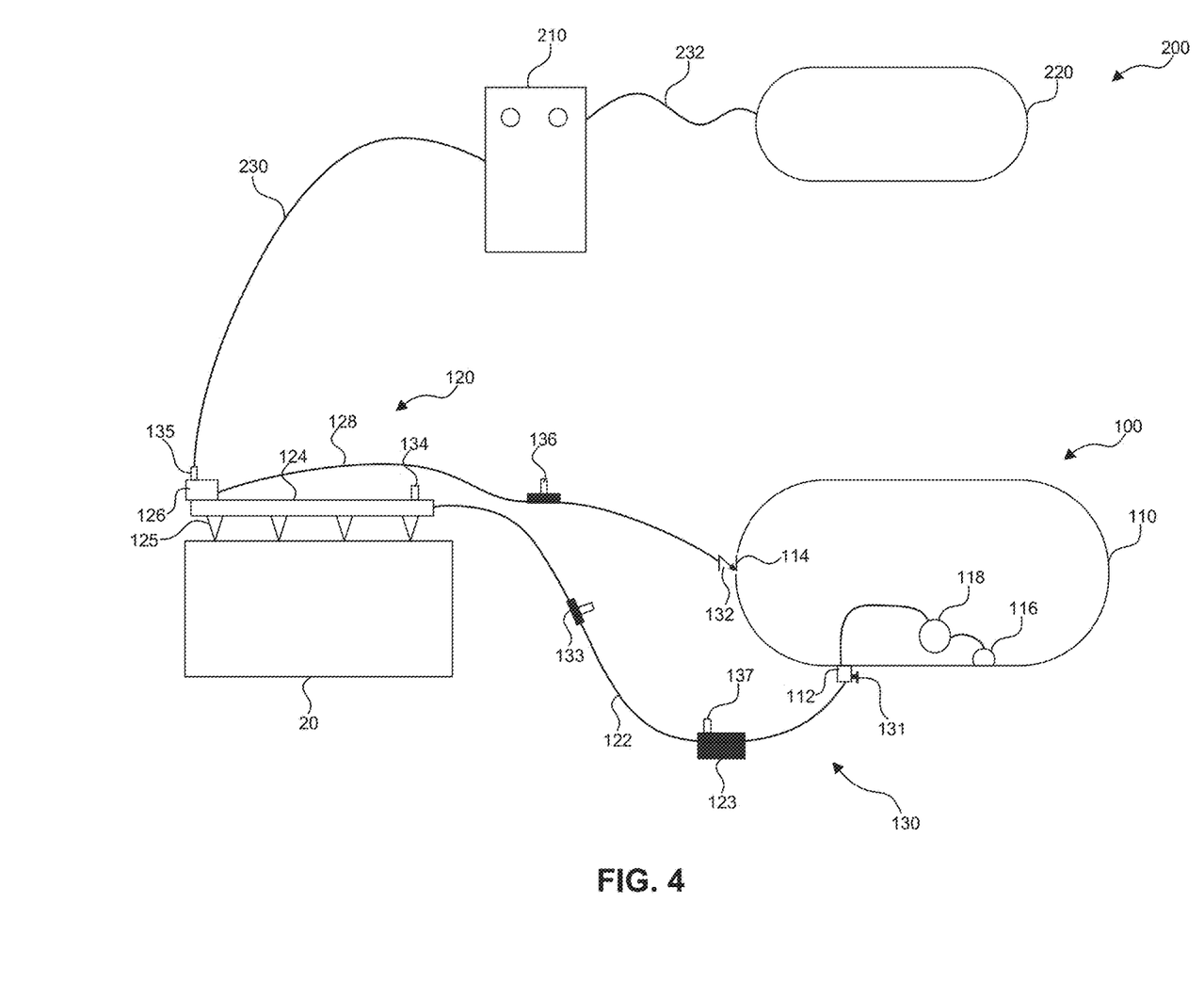
FIG. 4 is a schematic diagram illustrating a fuel system, according to embodiments of the present disclosure.

In some embodiments, as shown in FIGS. 2-8, the one or more fuel discharge valves 133-138 include a third fuel discharge valve 135 coupled to pressure regulator 126. In some embodiments, third fuel discharge valve 135 is configured to allow removal of LP fuel disposed in fuel rail 124 and/or pressure regulator 126, such as removing LP fuel to connection tube 230 of evacuation system 200, as shown in FIG. 4, for example.

Figure 5:
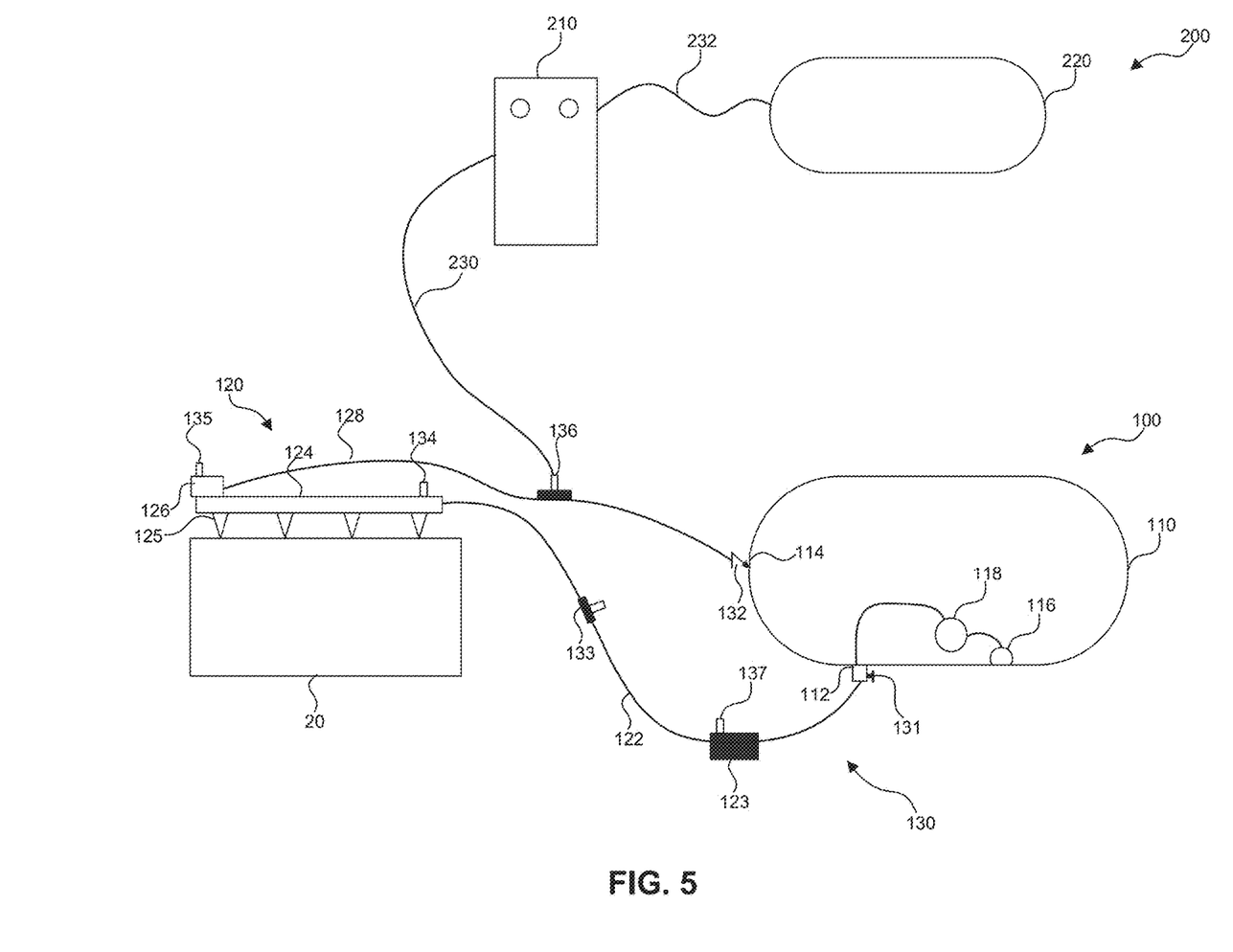
FIG. 5 is a schematic diagram illustrating a fuel system, according to embodiments of the present disclosure.

In some embodiments, as shown in FIGS. 2-8, the one or more fuel discharge valves 133-138 include a fourth fuel discharge valve 136 coupled to return line 128. In some embodiments, fourth fuel discharge valve 136 is configured to allow removal of LP fuel disposed in return line 128, such as removing LP fuel to connection tube 230 of evacuation system 200, as shown in FIG. 5, for example.

Figure 6:
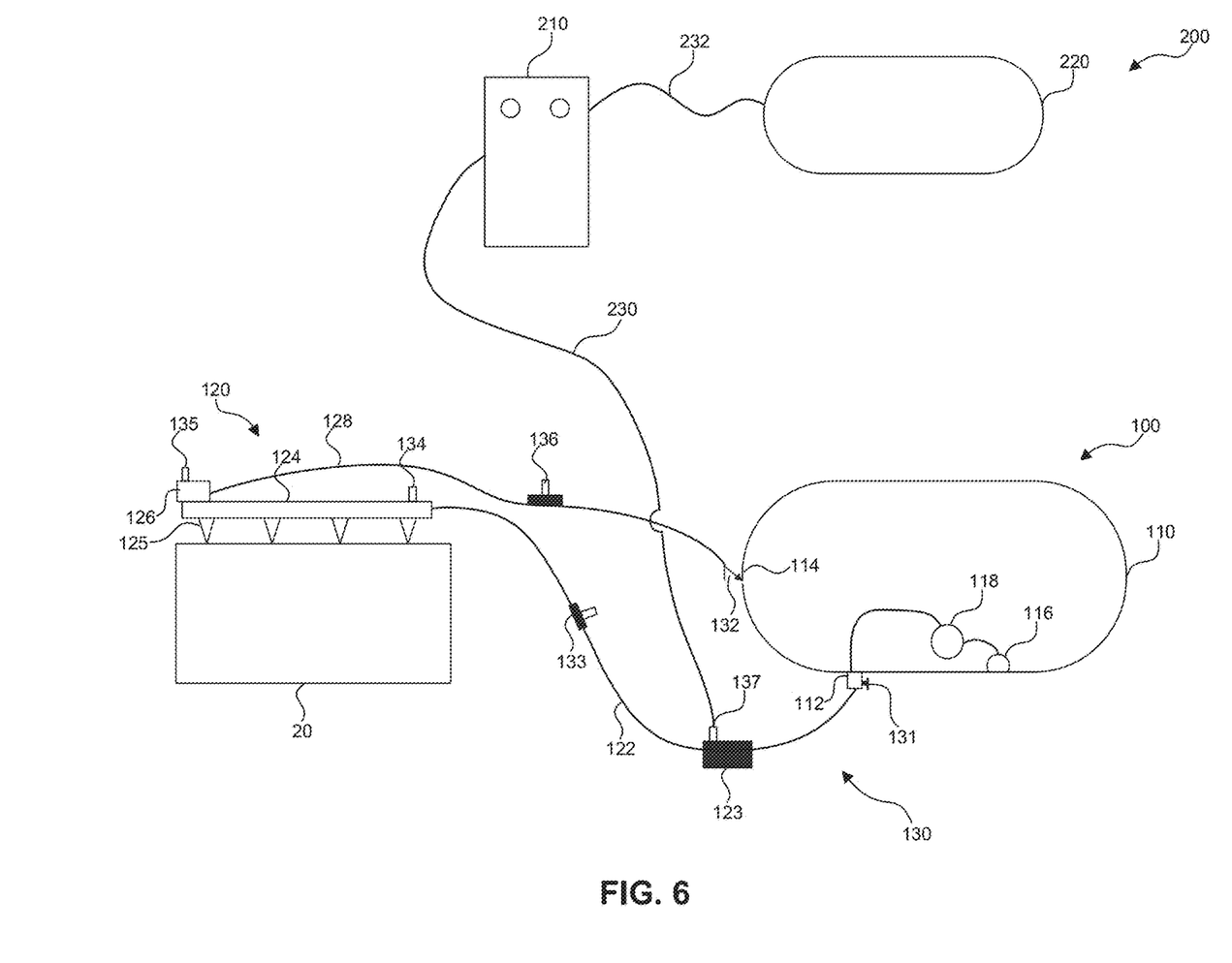
FIG. 6 is a schematic diagram illustrating a fuel system, according to embodiments of the present disclosure.

In some embodiments, as shown in FIGS. 2-8, the one or more fuel discharge valves 133-138 include a fifth fuel discharge valve 137 coupled to fuel line filter 123. In some embodiments, fifth fuel discharge valve 137 is configured to allow removal of LP fuel disposed in fuel line filter 123 and/or engine supply line 122, such as removing LP fuel to connection tube 230 of evacuation system 200, as shown in FIG. 6, for example.

In some embodiments, as shown in FIGS. 7 and 8, for example, the one or more fuel discharge valves 133-138 include a sixth fuel discharge valve 138 coupled to supply pump 140. In some embodiments, sixth fuel discharge valve 138 is configured to allow removal of LP fuel disposed in engine supply line 122, such as removing LP fuel to connection tube 230 of evacuation system 200, as shown in FIGS. 7 and 8, for example.

In operation, isolation valve 131 may be set to the closed position to isolate fuel stored in vehicle fuel tank 110 from fuel distribution system 120. In some embodiments, connection tube 230 of evacuation system 200 may be selectively connected to any one of the one or more fuel discharge valves 133-138 to remove fuel from a selected portion of fuel distribution system 120. In some embodiments, multiple connection tubes 230 from one or more evacuator 210 may be simultaneously connected to respective fuel discharge valves 133-138. In some embodiments, once isolation valve 131 is set to the closed position, vehicle refueling valve 150 may be used to direct fuel from fuel distribution system 120 back to the vehicle fuel tank 110 through tank fill port 115, such that fuel is removed from fuel distribution system 120. In some embodiments, supply pump 140 may be used to drive removal of fuel from distribution system 120 through tank refueling valve 150 back to tank fill port 115. In some embodiments, OPD 160 plugs tank fill port 115 and prevents the removed fuel from being added to vehicle fuel tank 110 when vehicle fuel tank exceeds a predetermined fuel level (e.g., 70%, 80%, or 90% of vehicle fuel tank 110).

In some embodiments, the one or more fuel discharge valves 133-138 may be integrated as a three-way valve at a selected location along fuel distribution system 120. In one embodiment, for example, the one or more fuel discharge valves 133-138 may include a three-way valve disposed on pressure regulator 126 and having three ports, including a first port fluidly connected to fuel rail 124, a second port fluidly connected to return line 128, and a third port fluidly connected to evacuation system 200. In some embodiments, the operation of the three-way fuel discharge valve may be sequenced such that fuel is removed from fuel rail 124 through opening first and third ports of the three-way valve, and then, fuel is removed from return line 128 through opening second and third ports of the three-way valve, such that fuel is removed from entire fuel distribution system 120. Similar three-way valves may be used at other locations of the fuel distribution system 120.

Figure 10:
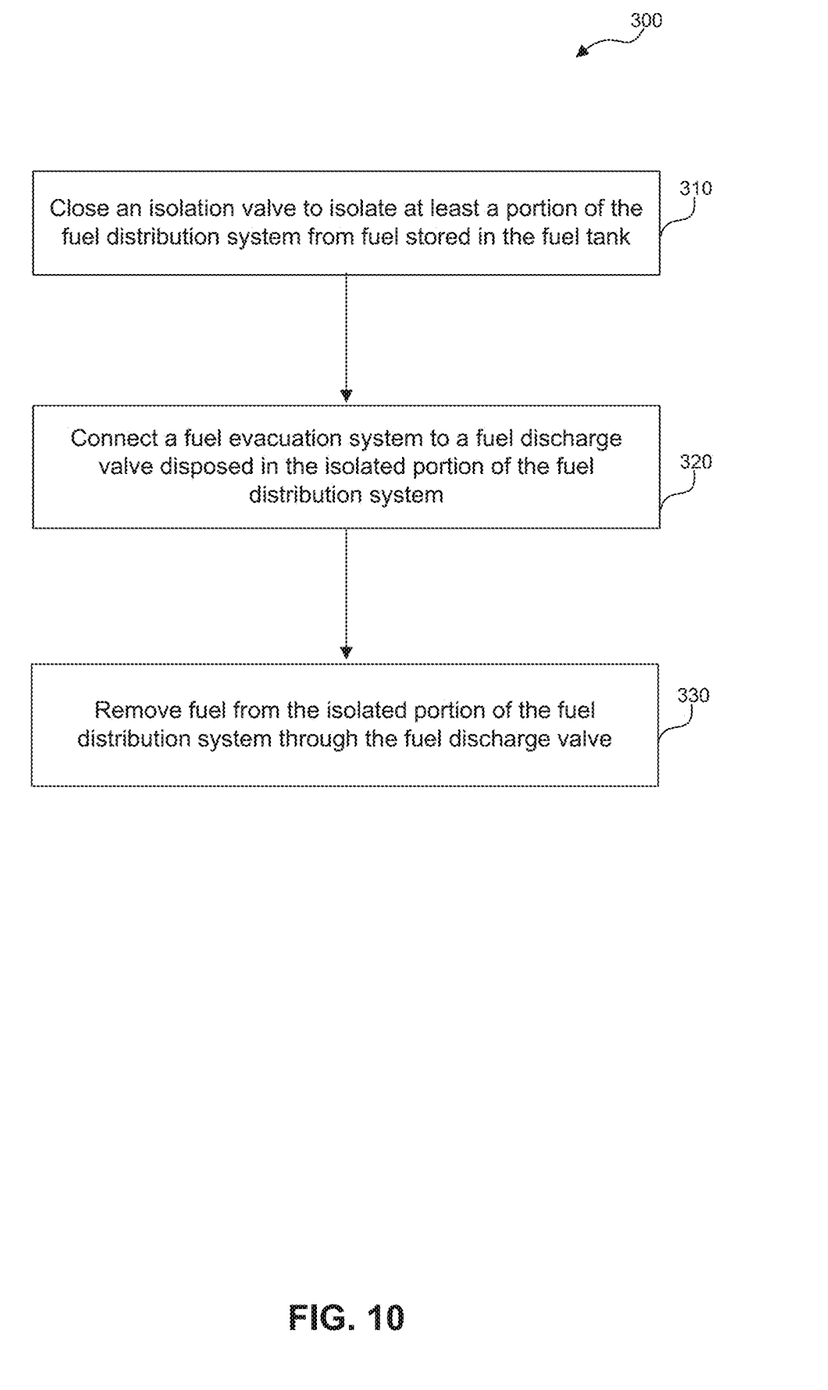
FIG. 10 is a flow chart of a method for evacuating fuel from a fuel distribution system according to embodiments of the present disclosure.

FIG. 10 illustrates an example method 300 for evacuating LP fuel from fuel distribution system 120.

In some embodiments, method 300 may include a step 310 of closing an isolation valve that is located in fuel distribution system 120 to isolate at least a portion of fuel distribution system 120 from fuel stored in vehicle fuel tank 110. In some embodiments, step 310 includes closing first isolation valve 131 coupled to engine supply line 122 and tank outlet port 112 to isolate fuel stored in vehicle fuel tank 110 from engine supply line 122. In some embodiments, step 310 includes closing second isolation valve 132 coupled to return line 128 and tank return port 114 to isolate fuel stored in vehicle fuel tank 110 from fuel rail 124. In some embodiments, step 310 includes closing both first isolation valve 131 and second isolation valve 132.

In some embodiments, method 300 may include a step 320 of connecting fuel evacuation system 200 to a fuel discharge valve 133-138 disposed in the isolated portion of the fuel distribution system 120. In some embodiments, step 320 includes connecting the connection tube 230 to first fuel discharge valve 133 disposed in engine supply line 122. In some embodiments, step 320 includes connecting connection tube 230 to second fuel discharge valve 134 disposed on fuel rail 124. In some embodiments, step 320 includes connecting connection tube 230 to third fuel discharge valve 135 coupled to pressure regulator 126. In some embodiments, step 320 includes connecting connection tube 230 to fourth fuel discharge valve 136 disposed in return line 128. In some embodiments, step 320 includes connecting connection tube 230 to fifth fuel discharge valve 137 coupled to fuel line filter 123. In some embodiments, step 320 includes connecting connection tube 230 to a sixth fuel discharge valve 138 coupled to supply pump 140. In some embodiments, step 320 includes connecting more than one connection tube 230 to respective fuel discharge valve 133-138.

In some embodiments, method 300 may include a step 330 of removing, through the fuel discharge valve, fuel from the isolated portion of the fuel distribution system 120. In some embodiments, step 330 includes removing fuel from engine supply line 122, for example, through first fuel discharge valve 133. In some embodiments, step 330 includes removing fuel from fuel rail 124, for example, through second fuel discharge valve 134. In some embodiments, step 330 includes removing fuel from fuel rail 124, for example, through third fuel discharge valve 135. In some embodiments, step 330 includes removing fuel from return line 128, for example, through fourth fuel discharge valve 136. In some embodiments, step 330 includes removing fuel from engine supply line 122, for example, through fifth fuel discharge valve 137. In some embodiments, step 330 includes removing fuel from engine supply line 122, for example, through sixth fuel discharge valve 138. In some embodiments, step 330 includes using the supply pump 140 to remove fuel from engine supply line 122 to evacuation system 200, for example, through sixth fuel discharge valve 138. In some embodiments, step 330 includes removing fuel from more than one portion of the fuel distribution system 120. In some embodiments, step 330 includes bringing all or a portion of fuel distribution system 120 to a vacuum.

In some embodiments, steps 320 and 330 may be performed according to a procedure of sub-steps. In some embodiments, for example, as a first sub-step, connection tube 230 may be connected to first fuel discharge valve 133 and remove fuel from engine supply line 122 to evacuation system 200 through first fuel discharge valve 133. In some embodiments, for example, as a second sub-step, connection tube 230 may be connected to third fuel discharge valve 135 and remove fuel from fuel rail 124 and pressure regulator 126 to evacuation system 200 through third fuel discharge valve 135. In some embodiments, for example, as a third sub-step, connection tube 230 may be connected to fourth fuel discharge valve 136 and remove fuel from return line 128 to evacuation system 200 through fourth fuel discharge valve 136. Accordingly, service may be conducted on selected portions of fuel distribution system 120, without needing to empty vehicle fuel tank 110.

It is to be appreciated that the Detailed Description section, and not the Brief Summary and Abstract sections, is intended to be used to interpret the claims. The Brief Summary and Abstract sections may set forth one or more, but not all embodiments, and thus, is not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the disclosure should not be limited by any of the above-described embodiments, but should be defined only in accordance with the following claims and their equivalents.

What is claimed is:

1. A fuel system for a vehicle, comprising:
a fuel tank configured to store liquefied petroleum gas (LPG) fuel, the fuel tank comprising a tank outlet port and a tank return port;
a LPG fuel distribution system configured to supply LPG fuel from the outlet port of the fuel tank to an engine and to the tank return port, the LPG fuel distribution system comprising:
an engine supply line coupled to the tank outlet port,
a fuel rail coupled to the engine supply line,
a fuel pressure regulator coupled to the fuel rail, the fuel pressure regulator configured to divert LPG fuel from the fuel rail, and
a return line coupled to the fuel pressure regulator and the tank return port for returning LPG fuel diverted from the fuel pressure regulator to the fuel tank through the tank return port; and
a fuel discharge valve disposed on the LPG fuel distribution system for removing LPG fuel from the LPG fuel distribution system to a storage tank disposed outside of the vehicle,
wherein the fuel discharge valve is coupled to the fuel pressure regulator or the return line.

2. The fuel system of claim 1, wherein the fuel discharge valve is a Schrader valve.

3. The fuel system of claim 1, further comprising:
an isolation valve coupled to the LPG fuel distribution system and configured to selectively isolate the LPG fuel stored in the fuel tank from at least a portion of the LPG fuel distribution system,
wherein the fuel discharge valve is configured to allow removal of LPG fuel from the isolated portion of the LPG fuel distribution system without requiring removal of LPG fuel from the fuel tank.

4. The fuel system of claim 1, further comprising:
a fuel line filter serially coupled to the engine supply line, and
a second fuel discharge valve coupled to the fuel line filter.

5. The fuel system of claim 1, further comprising:
a supply pump coupled to the engine supply line for driving LPG fuel flow from the tank outlet port to the fuel rail, and
a second fuel discharge valve coupled to the supply pump.

6. The fuel system of claim 5, wherein the fuel tank further comprises a tank fill port configured to receive LPG fuel from the LPG fuel distribution system,
wherein the LPG fuel distribution system further comprises:
a vehicle fuel return valve including a receiving port coupled to the tank outlet port via the engine supply line, a first outlet port coupled to the tank fill port via a refuel line, and a second outlet port coupled to the fuel rail of the vehicle via the engine supply line, the vehicle fuel return valve configured to selectively direct LPG fuel from the receiving port to the tank fill port to remove LPG fuel from the LPG fuel distribution system.

7. The fuel system of claim 1, further comprising a check valve coupled to the return line and configured to prevent the LPG fuel stored in the fuel tank from flowing toward the fuel rail.

8. A fuel system for a vehicle, comprising:
a fuel tank configured to store liquefied petroleum gas (LPG) fuel, the fuel tank comprising a tank outlet port and a tank fill port;
a LPG fuel distribution system configured to supply LPG fuel from the tank outlet port of the fuel tank to an engine and to the tank fill port, the LPG fuel distribution system comprising:
an engine supply line coupled to the tank outlet port,
a supply pump coupled to the engine supply line for driving LPG fuel flow from the tank outlet port of the fuel tank to the engine, and
a vehicle fuel return valve including a receiving port coupled to the tank outlet port via the engine supply line, a first outlet port coupled to the tank fill port via a refuel line, and a second outlet port coupled to a fuel rail of the vehicle via the engine supply line, the vehicle fuel return valve configured to selectively direct fuel from the receiving port to the tank fill port to remove LPG fuel from the LPG fuel distribution system; and a fuel discharge valve coupled to the supply pump for removing LPG fuel from the engine supply line.

9. The fuel system of claim 8, wherein the fuel tank further comprises a tank return port configured to receive LPG fuel from the LPG fuel distribution system, and wherein the LPG fuel distribution system further comprises a flush line coupled to the supply pump and the tank return port for returning LPG fuel from the engine supply line to the fuel tank through the tank return port.

10. The fuel system of claim 8, further comprising:

an isolation valve coupled to the LPG fuel distribution system and configured to selectively isolate the LPG fuel stored in the fuel tank from at least a portion of the LPG fuel distribution system, wherein the fuel discharge valve is configured to allow removal of LPG fuel from the isolated portion of the LPG fuel distribution system without requiring removal of fuel from the fuel tank.

11. A vehicle comprising:

an engine;

a fuel system, the fuel system comprising:

a fuel tank configured to store liquefied petroleum gas (LPG) fuel, the fuel tank comprising a tank outlet port and a tank return port;

a LPG fuel distribution system configured to supply LPG fuel from the fuel tank to the engine, the LPG fuel distribution system comprising:

an engine supply line coupled to the tank outlet port, and a fuel rail disposed on the engine and coupled to the engine supply line, a fuel pressure regulator coupled to the fuel rail, the fuel pressure regulator configured to divert LPG fuel from the fuel rail, and a return line coupled to the fuel pressure regulator and the tank return port for returning LPG fuel diverted from the fuel pressure regulator to the fuel tank through the tank return port; and a fuel discharge valve disposed on the LPG fuel distribution system for removing LPG fuel from the LPG fuel distribution system to a storage tank disposed outside of the vehicle, wherein the fuel discharge valve is coupled to the fuel pressure regulator or the return line.

12. The vehicle of claim 11, wherein the LPG fuel distribution system further comprises:

an isolation valve coupled to the LPG fuel distribution system and configured to selectively isolate the LPG fuel stored in the fuel tank from at least a portion of the LPG fuel distribution system, wherein the fuel discharge valve is configured to allow removal of LPG fuel from the isolated portion of the LPG fuel distribution system without requiring removal of LPG fuel from the fuel tank.

13. The vehicle of claim 11, further comprising:

a fuel line filter serially coupled to the engine supply line, and a second fuel discharge valve coupled to the fuel line filter.

14. The vehicle of claim 11, further comprising:

a supply pump coupled to the engine supply line for driving LPG fuel flow from the tank outlet port to the fuel rail, and a second fuel discharge valve is coupled to the supply pump.

15. The vehicle of claim 11, wherein the LPG fuel distribution system further comprises:

a check valve coupled to the return line and configured to prevent the LPG fuel stored in the fuel tank from flowing toward the fuel rail.

* * * * *